May 28, 1929.   L. L. MARTIN   1,715,140
SPRAYING DISTRIBUTOR
Filed Feb. 9, 1925
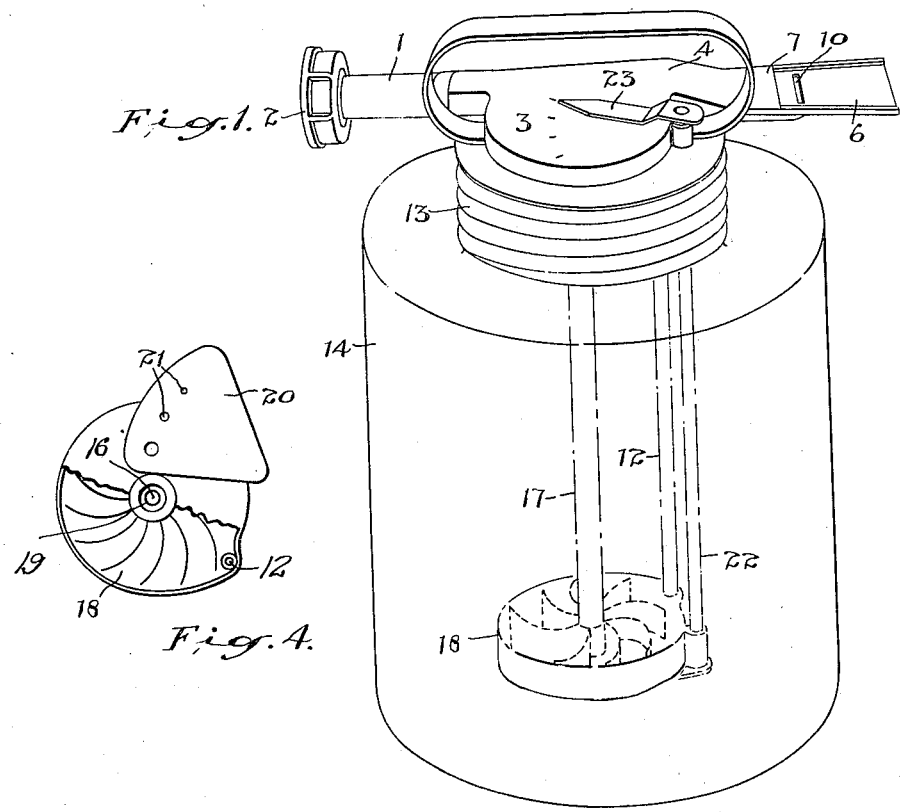
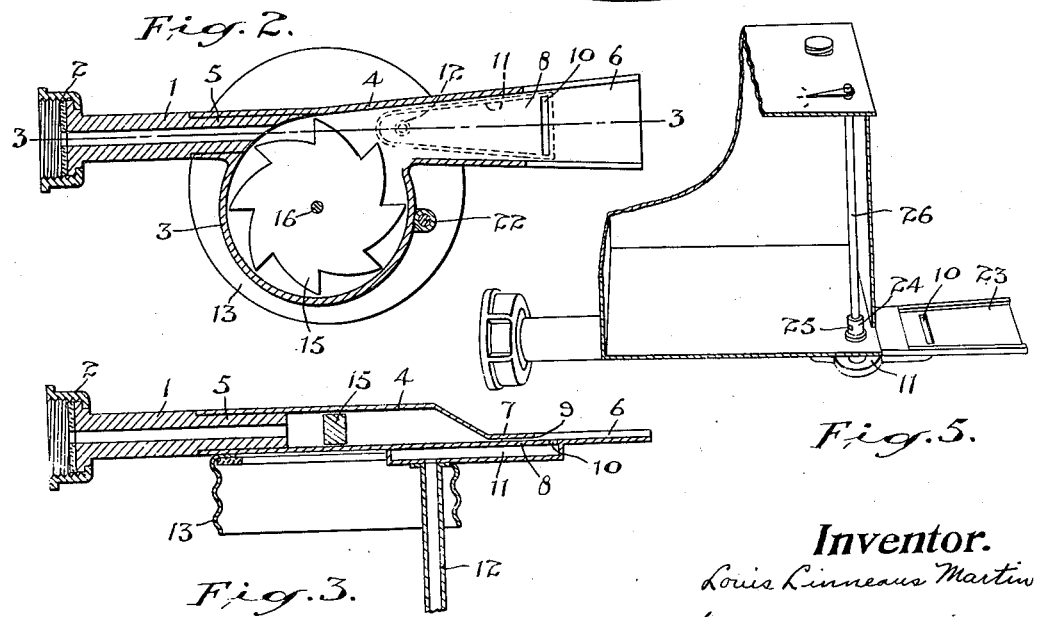
Inventor.
Louis Linneaus Martin
by H. J. S. Dennison atty.

Patented May 28, 1929.

1,715,140

UNITED STATES PATENT OFFICE.

LOUIS LINNEAUS MARTIN, OF TORONTO, ONTARIO, CANADA.

SPRAYING DISTRIBUTOR.

Application filed February 9, 1925. Serial No. 8,054.

The principal objects of the invention are to accomplish the thorough and uniform mixture of a measured quantity of material with a flowing fluid, thereby effecting a uniform distribution of the material over a desired area, particularly to distribute a fertilizing or an insecticide material over large areas in small quantities and in such a manner as to obviate injury to the plant life.

The principal feature of the invention consists in feeding the material to be distributed by means of a regulated mechanism to an orifice in the discharge end of a nozzle over which a stream of a fluid distributor is directed.

In the accompanying drawings Figure 1 is a perspective view of my improved device.

Figure 2 is a horizontal mid-sectional view through the spraying nozzle.

Figure 3 is a vertical sectional view through the line 3—3 of Figure 2.

Figure 4 is an underside plan view of the pump casing and control valve, part of the casing being broken away showing the impeller member arranged therein.

Figure 5 is a sectional perspective detail of a modified form of device.

The use of chemical fertilizers and insecticides has been limited to a comparatively narrow field owing to the inadequacy of means for uniformly distributing same in quantities which would not be injurious to plant life and it is the purport of this invention to utilize water under pressure as a distributing medium and to feed the chemical material to the water in a regulated quantity and in such a manner that the distribution will be uniform.

In the form of the invention illustrated in Figures 1 to 4 the nozzle member is formed of a tubular member 1 provided with a suitable coupling 2 for attaching to a hose. A casing 3 of circular form is provided with a tangentially arranged tubular extension 4 which fits over the nozzle end 5 of the member 1 and in axial alignment with the extension 4 is arranged the flaring spray nozzle 6.

The top wall 7 of the nozzle 6 is sloped downwardly and its extremity extends parallelly above the bottom 8 forming a broad thin orifice 9 from which the water is projected in a thin flaring sheet. The bottom 8 extends beyond the mouth of the discharge orifice 9 and is provided with a transverse slot 10 arranged a short distance beyond the discharge orifice.

Beneath the bottom of the flaring flat portion of the casing is arranged a chamber 11 which leads to the slot 10 and a tube 12 leads downwardly from said chamber and is adapted to conduct the material that is to be projected through the slot 10 to mix with the water.

The casing 3 has secured to its underside a threaded cap 13 which screws on to the top of the container 14 in which the chemical mixture is held.

Within the casing 3 is arranged a suitable turbine wheel 15 which is secured to a shaft 16 and this shaft extends through a tube 17 secured to and extending downwardly from the casing.

At the lower end of the tube 17 is secured a circular casing 18 and a suitable impeller is arranged therein on the lower end of the shaft. The tube 12 leading from the chamber 11 is connected to the casing 18 and the impeller directs the fluid material in the container upwardly through said tube.

The inlet opening 19 in the bottom of the casing 18 is controlled by a valve 20 which is provided with a graduated row of openings 21. This valve is secured to a rod 22 which extends through the cap 13 outside the casing 3 and an indicating finger 23 is secured to the top of said rod. The pumping device is suspended from the cap 13 close to the bottom of the container consequently the fluid is always taken from the bottom and if there is any tendency for solids in the fluid to precipitate and settle these will be picked up as they settle and they will not be allowed to form a sediment or congest in any one place.

In operating the device, the water entering the member 1 is projected in a small jet against the wheel 15, rotating said wheel and then passing through the discharge orifice 9.

The rotation of the wheel 15 operates the impeller in the lower casing 18 and the fluid in the container is drawn in through the inlet 19, the flow being regulated by the valve 20, and it is forced upwardly through the tube 12 to the chamber 11 and is discharged through the slot 10 into the thin sheet of water flowing over the slot. The fluid is thus fed uniformly to the water and is sprayed in a fine spray over the surface to be covered.

A device such as described enables the use of chemical fertilizers on lawns and gardens where it has been previously prohibitive on account of the necessity for an expensive apparatus in the form of a spray motor or pump but a device as here shown may be furnished at very low cost and may be used wherever a pressure supply of water is available.

In the structure illustrated in Figure 5, the spraying nozzle 23 is substantially the same as shown in Figures 1, 2 and 3 except that the turbine wheel and casing is omitted.

The nozzle is secured to the bottom of a suitable container and a tube 24 extends upwardly from the chamber 11 into the container and is provided with a slot opening 25 through which the fluid flows by gravity to the chamber 11 and the discharge slot 10. A suitable valve is arranged in the tube 24 to control the flow and a control rod 26 extends upwardly through the container.

It will be readily understood that many modifications of this structure may be devised without departing from the spirit of the invention which is to feed a measured quantity of material to be distributed into a stream of water discharged from a spraying nozzle.

What I claim as my invention is:

1. In a spraying distributor, the combination with a pressure water supply, of a nozzle connected with said pressure supply for directing the flow of water therefrom and having the bottom wall projecting longitudinally beyond the discharge opening, a slot opening into the top side of said bottom wall at the outward side of the discharge opening, a liquid container, and a conduit conducting liquid from said container leading to the slot in the bottom wall of the nozzle.

2. In a spraying distributor, the combination with a pressure water supply, of a nozzle connected to said pressure water supply and having converging top and bottom walls flaring laterally and forming a broad thin discharge opening, said nozzle having its bottom wall extending longitudinally beyond the discharge opening and having a transverse slot therein arranged outside the discharge opening, a conduit arranged beneath said nozzle connected with said slot, a container connected with said conduit, and means for regulating the flow of fluid from said container to said conduit.

3. In a spraying distributor the combination with a pressure water supply, of a nozzle connected with said pressure supply for directing the flow of water therefrom and having the bottom wall projecting longitudinally beyond the discharge opening, a slot opening into the top side of said bottom wall at the outward side of the discharge opening, a liquid container, a conduit conducting liquid from said container to the slot in the bottom wall of the nozzle, and means for regulating the flow of liquid from the container to the conduit.

4. In a spraying distributor, a nozzle adapted to be connected to a pressure water supply and having converging top and bottom walls flaring laterally and forming a broad thin discharge opening, said nozzle having its bottom wall extending longitudinally beyond the discharge opening in a flat flaring member having upwardly flanged edges, a conduit arranged beneath said nozzle having a discharge leading through a slot extending across said flat flaring member between the flanged edges, a fluid container connected with said conduit, and means for regulating the flow of fluid from said container.

5. A spraying distributor, comprising, a nozzle adapted to be connected to a pressure water supply having a spraying discharge opening, means for delivering a fluid material into the water as it passes from said spraying discharge, and mechanical means actuated by the pressure of the water flowing through the nozzle for feeding the fluid material in a uniformly continuous manner to the water being discharged from the nozzle.

6. A spraying distributor, comprising, a nozzle having a pressure fluid passage leading thereto, a fluid chamber having a discharge opening immediately beyond the discharge of the nozzle, a rotary member actuated by the flow of fluid to the nozzle, an impeller arranged in said fluid chamber and actuated by said rotary member, and means for conducting the material to be distributed from said impeller to the fluid chamber opening beyond said nozzle.

7. A spraying distributor, comprising a fluid container, a nozzle having a pressure fluid passage leading thereto, an opening in the wall of said nozzle beyond its discharge opening, a rotary member actuated by the flow of fluid through the nozzle, an impeller arranged within said fluid container and actuated by said rotary member, a casing enclosing said impeller, an opening in said casing connecting its interior with the interior of said container, a duct leading from said casing to the opening in said nozzle, and means for varying the effective size of said connecting opening.

8. A spraying distributor, comprising, a nozzle having a pressure fluid passage, an opening in the wall of said nozzle beyond the discharge end, a rotary member actuated by the flow of fluid through the nozzle, an impeller actuated by said rotary member, a casing enclosing said impeller and having an inlet opening, a plate covering said opening having a plurality of graduated openings adapted to be moved consecutively into register with the opening in said casing, and a duct leading from said casing to the opening beyond said nozzle.

9. A spraying distributor, comprising, a nozzle having a broad flat discharge, and a flat trough-shaped extension beyond the discharge, an orifice extending across said extension, a duct leading to said orifice, means actuated by the flow of fluid through said nozzle for actuating means for feeding the material in a uniformly continuous manner to be distributed to said duct, and means for regulating the quantity of material fed to said duct.

10. In a spraying distributor, a casing having a nozzle at one side, a turbine wheel arranged in alignment with said nozzle, a convergent discharge nozzle having a broad flat discharge opening arranged in alignment with the aforesaid nozzle, a diverging extension projecting beyond said discharge, a transverse slot in said extension, a chamber arranged beneath said extension and leading to said transverse slot, a tube leading from said chamber, a rotary pump operated by said turbine wheel and connected to said tube, and means for regulating the supply to said pump.

11. In a spraying distributor, the combination with a fluid receptacle, of a cap for said receptacle, a rotor mounted on said cap, a casing enclosing said rotor, a pressure nozzle leading to said casing, a spray nozzle leading from said casing for receiving and directing the medium fed to the casing by said pressure nozzle and having an opening in the side wall beyond the point of discharge, a duct leading to said opening, a casing connected with said duct and with said fluid receptacle, a rotary impeller in said latter casing, a shaft connecting said impeller with said rotor, and means carried by said cap for regulating the supply of fluid to said impeller casing.

LOUIS LINNEAUS MARTIN.